(12) United States Patent
Haddad et al.

(10) Patent No.: US 8,769,285 B2
(45) Date of Patent: Jul. 1, 2014

(54) METHODS AND APPARATUS FOR DERIVING, COMMUNICATING AND/OR VERIFYING OWNERSHIP OF EXPRESSIONS

(75) Inventors: Wassim Haddad, Boulder, CO (US);
Georgios Tsirtsis, London (GB);
Vincent D. Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 814 days.

(21) Appl. No.: 12/540,982

(22) Filed: Aug. 13, 2009

(65) Prior Publication Data

US 2011/0039592 A1 Feb. 17, 2011

(51) Int. Cl.
*H04L 29/06* (2006.01)
(52) U.S. Cl.
USPC ........................................................ 713/170
(58) Field of Classification Search
None
See application file for complete search history.

(56) References Cited

U.S. PATENT DOCUMENTS

| | | | | |
|---|---|---|---|---|
| 8,117,273 | B1* | 2/2012 | Mathur et al. | 709/207 |
| 2003/0147537 | A1* | 8/2003 | Jing et al. | 380/277 |
| 2003/0204742 | A1* | 10/2003 | Gupta et al. | 713/200 |
| 2004/0030743 | A1* | 2/2004 | Hugly et al. | 709/203 |
| 2004/0240669 | A1* | 12/2004 | Kempf et al. | 380/277 |
| 2006/0174116 | A1* | 8/2006 | Balfanz et al. | 713/168 |
| 2006/0253704 | A1* | 11/2006 | Kempf et al. | 713/158 |
| 2007/0113096 | A1 | 5/2007 | Zhu et al. | |
| 2008/0205653 | A1* | 8/2008 | Haddad | 380/278 |
| 2008/0307054 | A1* | 12/2008 | Kamarthy et al. | 709/206 |
| 2009/0016248 | A1* | 1/2009 | Li et al. | 370/310.1 |

FOREIGN PATENT DOCUMENTS

| | | |
|---|---|---|
| EP | 1501252 A2 | 1/2005 |
| GB | 2297016 A | 7/1996 |
| JP | 2009534940 A | 9/2009 |
| WO | WO-2007124180 A2 | 11/2007 |

OTHER PUBLICATIONS

International Search Report and Written Opinion—PCT/US2010/044281, International Search Authority—European Patent Office—Dec. 28, 2010.
Taiwan Search Report—TW099125618—TIPO—May 29, 2013.

* cited by examiner

*Primary Examiner* — David Pearson
(74) *Attorney, Agent, or Firm* — James K. O'Hare

(57) ABSTRACT

Methods and apparatus for generating, communicating, and/or verifying ownership of expressions are described. Various embodiments are well suited for use in a wireless peer to peer communications systems in which expressions are communicated, e.g., broadcast, in discovery intervals. A first communications device generates an expression from a first public key and an additional input, said first public key corresponding to a private key known to said first communications device. The first device transmits the generated expression on a communications channel used for discovery. A second communications device receives the transmitted expression from the first device. The second device transmits a request signal to the first device associated with the expression; and receives from the first device a signed communication signed using a private key known to said first communications device. The second device uses information from the signed communication to determine if said first communication device owns said expression.

32 Claims, 10 Drawing Sheets

METHODS AND APPARATUS FOR DERIVING, COMMUNICATING AND/OR VERIFYING OWNERSHIP OF EXPRESSIONS

FIELD

Various embodiments relate to communications, and more particularly, to methods and apparatus which can be used for generating, communicating, and/or verifying ownership of expressions.

BACKGROUND

In a wireless communications system, a communication device may wish to advertise information to be available to other devices in its local vicinity, e.g., presence information, identification information, location information, service information, requests, offers, etc. The information may be advertised for other devices to discover and take subsequent action. For example, based on a detected identifier corresponding to information or an item of interest, a device which detected the discovery information of interest may attempt to establish a connection with the device which transmitted the discovery information of interest. In wireless peer to peer communications systems lacking centralized control, there is a need for devices to be able to recognize the presence of other devices of interest in their vicinity, and the implementation of discovery channels to be used for such a purpose can be beneficial.

In addition to be able to communicate discovery information in a reliable manner, there is a need to provide a mechanism for protection from malicious nodes which may attempt to perform spoofing. Based on the above discussion, there is a need for methods and apparatus to provide confirmation with regard to information communicated on a discovery communications channel. In particular, there is a need for methods and apparatus which allow a receiving device to confirm that received information corresponds to a particular node in a manner that allows the receiving node to be sure that the particular node had control over or authorized the communication of the received information, e.g., communicated expression.

SUMMARY

Methods and apparatus for generating expressions, communicating expressions, and/or verifying that a node had control over or authorized the communication of a received expression are described. Verifying that a particular node had control over or authorized communication of a particular expression is sometimes referred to as determining or verifying that the particular node owns the expression. Accordingly, in various embodiments expressions are communicated in a manner that allows ownership of a received expression to be verified, e.g., via one or more communications with a node believed to be the owner of the expression. The owner of a received expression may be the node which transmitted the expression but, in the case of a retransmission or communication through an intermediate node, the owner of an expression may be different from the node from which an expression was received. Various described methods and apparatus are well suited for use in a wireless peer to peer communications system in which expressions are communicated, e.g., broadcast, in discovery intervals.

An exemplary method of operating a first communications device to communicate information, in accordance with some embodiments, comprises: generating an expression from a first public key and an additional input, said first public key corresponding to a private key known to said first communications device; and transmitting the generated expression on a communications channel used for discovery. An exemplary first communications device, in accordance with some embodiments, comprises at least one processor configured to: generate an expression from a first public key and an additional input, said first public key corresponding to a private key known to said first communications device; and transmit the generated expression on a communications channel used for discovery. The exemplary first communications device further comprises memory coupled to said at least one processor.

An exemplary method of operating a first communications device to verify ownership of an expression, in accordance with some embodiments, comprises: transmitting a signal to a second communications device associated with the expression; receiving from the second communications device a signed communication signed using a private key known to said second communications device; and determining if said second communication device owns said expression. In some such embodiments, said step of determining if said second communications device owns said expresses includes: determining if said expression was generated using a first public key and verifying that the signed communication was generated by a private key corresponding to said first public key. An exemplary first communications device, in accordance with some embodiments, comprises at least one processor configured to: transmit a signal to a second communications device associated with the expression; receive from the second communications device a signed communication signed using a private key known to said second communications device; and determine if said second communication device owns said expression. In some such embodiments, being configured to determine if said second communication device owns said expression includes being configured to: determine if said expression was generated using a first public key; and verify that the signed communication was generated by a private key corresponding to said first public key. The exemplary first communications device also includes memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
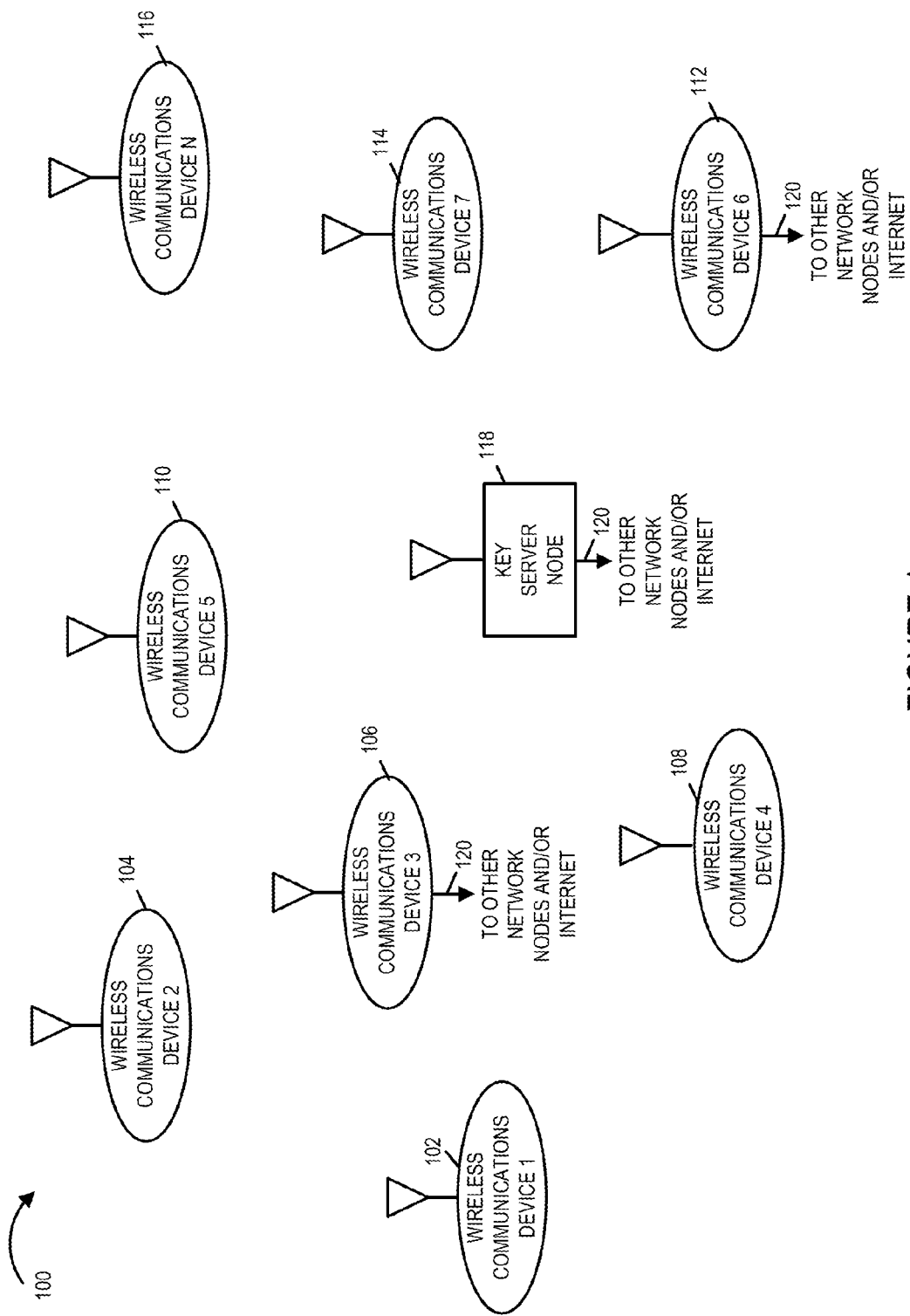
FIG. 1 is a drawing of an exemplary wireless communications system in accordance with an exemplary embodiment.

FIG. 1 is a drawing of an exemplary wireless communications system 100, e.g., a peer to peer wireless communications system, in accordance with an exemplary embodiment. Exemplary wireless communications system 100 includes a plurality of wireless communications devices (wireless communications device 1 102, wireless communications device 2 104, wireless communications device 3 106, wireless communications device 4 108, wireless communications device 5 110, wireless communications device 6 112, wireless communications device 7 114, . . . , wireless communications device N 116. Some of the wireless communications devices of system 100, e.g., device 3 106 and device 6 112, are coupled to other network nodes and/or the Internet via backhaul network 120. Some of the wireless communications devices of system 100 are mobile devices, e.g., devices (102, 104, 108, 110, 114, 116). Exemplary communications system 100 also includes a key server node 118 which includes both a wireless interface and a wired network interface.

The wireless communications devices (102, 104, 106, 108, 110, 112, 114, 116) support peer to peer communications and implement a peer to peer timing structure including discovery intervals. A first wireless communications device, e.g., device 1 102, may, and sometimes does, generate an expression using a public key and additional input, and then transmit the generated expression during the discovery interval. The expression may convey, e.g., information including one of: device identification information, user identification information, a service advertisement, a service request, a merchandise advertisement, a merchandise request, an offer, group identification information, location information, device capability information, or other information that may be of interest to other peer to peer devices.

A second wireless communication device, e.g., device 2 104, which may have monitoring for discovery interval signals, may receive the transmitted expression, and may desire to verify ownership of the detected expression. The second communications device receives a signed communication using a private key known to the first communications device. The second device determines if the first communications device owns the expression. In some embodiments, the determining includes determining if the received expression was generated using a first public key and verifying that the received signed communication was generated by a private key corresponding to the first public key.

Determining if the received expressed was generated using a first public key, in some embodiments, includes generating a test value based on information received in the signed communication and comparing the test value to the received expression. Verifying that the received signed communication was generated by a private key corresponding to the first public key, in some embodiments, includes performing a signature verification operation, e.g., using a standard public-private key verification method.

Figure 2:
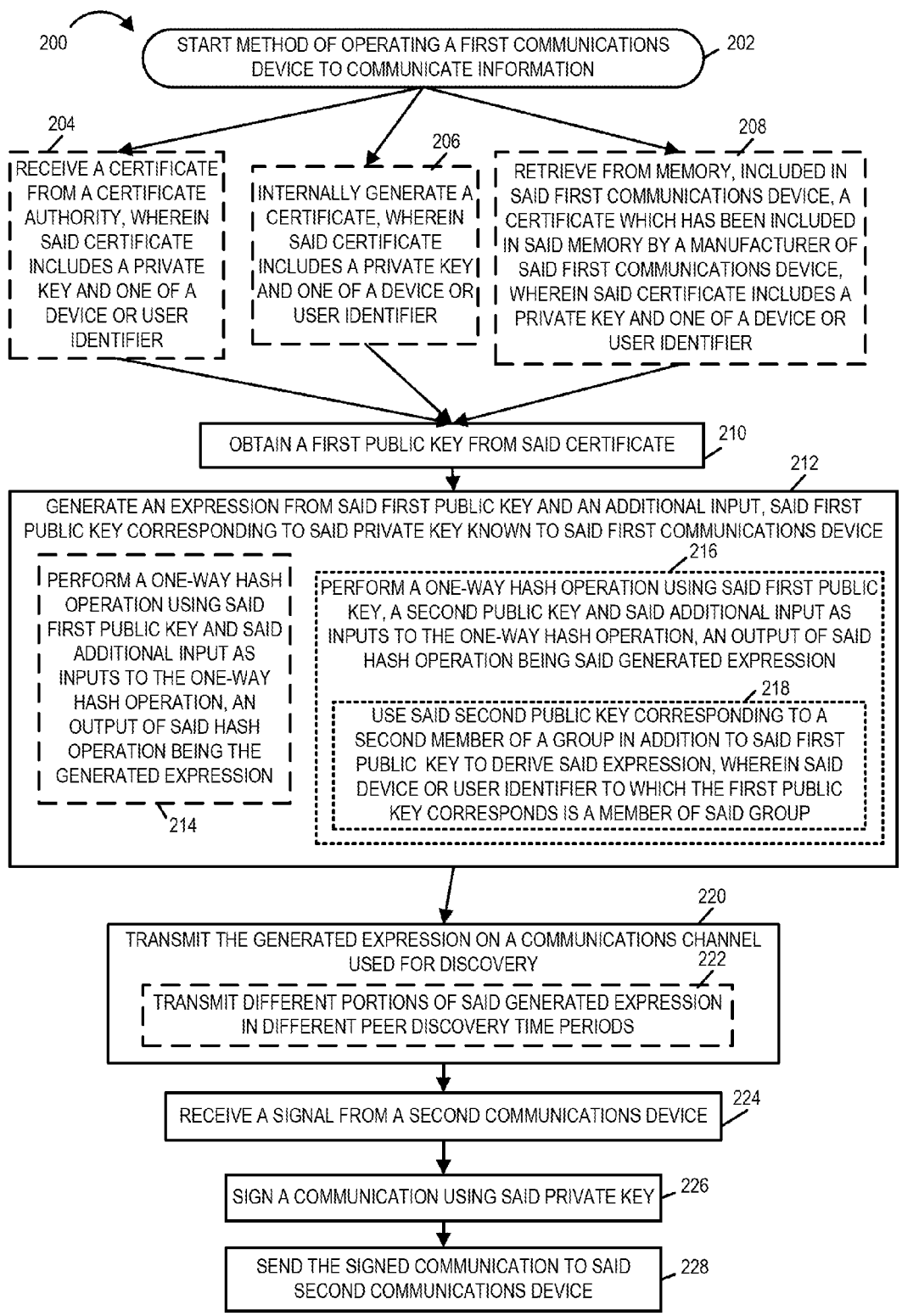
FIG. 2 is a flowchart of an exemplary method of operating a first communications device in accordance with an exemplary embodiment.

FIG. 2 is a flowchart 200 of an exemplary method of operating a first communications device to communicate information in accordance with various exemplary embodiments. Operation starts in step 202 where the first communications device is powered on and initialized and proceeds to one of steps 204, 206, and 208, e.g., depending upon the particular embodiment. In step 204 the first communications device receives a certificate from a certificate authority, wherein said certificate includes a private key and one of a device or user identifier. In step 206 the first communications device internally generates a certificate, wherein said certificate includes a private key and one of a device or user identifier. In step 208 the first communications device retrieves from memory, included in said first communications device, a certificate which has been included in said memory by a manufacturer of said first communications device, wherein said certificate includes a private key and one of a device or user identifier. Operation proceeds from one of steps 204, 206, and 208 to step 210.

In step 210 the first communications device obtains a first public key from said certificate. Operation proceeds from step 210 to step 212. In step 212 the first communications device generates an expression from said first public key and an additional input, said first public key corresponding to said private key known to said first communications device. The additional input, in some embodiments, is one of a random number and a time dependent input.

In some embodiments, step 212 includes sub-step 214. In some embodiments, step 212 includes sub-step 216. Returning to sub-step 214, in sub-step 214 the first communications device performs a one-way hash operation using said first public key and said addition input as inputs to the one-way hash operation, an output of said hash operation being the generated expression. Returning to sub-step 216, in sub-step 216 the first communications device performs a one-way hash operation using said first public key, a second public key and said additional input as inputs to the one-way hash operation, an output of the hash operation being said generated expression. Sub-step 216 includes sub-step 218 in which the first communications device uses said second public key corresponding to a second member of a group in addition to said first public key to derive said expression, wherein said device or user identifier to which the first public key corresponds is a member of said group.

Operation proceeds from step 212 to step 220. In step 220 the first communications device transmits the generated expression on a communications channel used for discovery. In some embodiments, the communications channel used for discovery corresponds to discovery time intervals in a peer to peer communications system. In various embodiments, transmitting includes wirelessly transmitting said expression using a wireless transmitter.

In some embodiments, the output of the hash operation is limited to a predetermined number of bits, and step 220 includes step 222. In step 222 the first communications device transmits different portions of said generated expression in different peer discovery time periods. Operation proceeds from step 220 to step 224. In step 224 the first communications device receives a signal from a second communications device, e.g., a request for a signed communication from the second communications device. Operation proceeds from step 224 to step 226, in which the first communications device signs a communication using said private key. In some embodiments, said signed communication includes at least one of: i) said public key and ii) said device or user identifier. The signed communication, in some embodiments, further includes hash information, said hash information including a hash function used to perform said hash operation and at least one input to said hash operation used to generate said expression. In various embodiments, the signed communication includes a plurality of public keys used to generate said expression. In some embodiments, the signed communication includes each of the parameters used to generate said expression as well as the detailed description of the mathematical function used for the hash used to generate said expression. The signed communication, in some embodiments, further includes hash information, said hash information including information used to identify or derive a hash function used to perform said hash operation and at least one input to said hash operation used to generate said expression. Then in step 228 the first communications device sends the signed communication to said second communications device.

Figure 3:
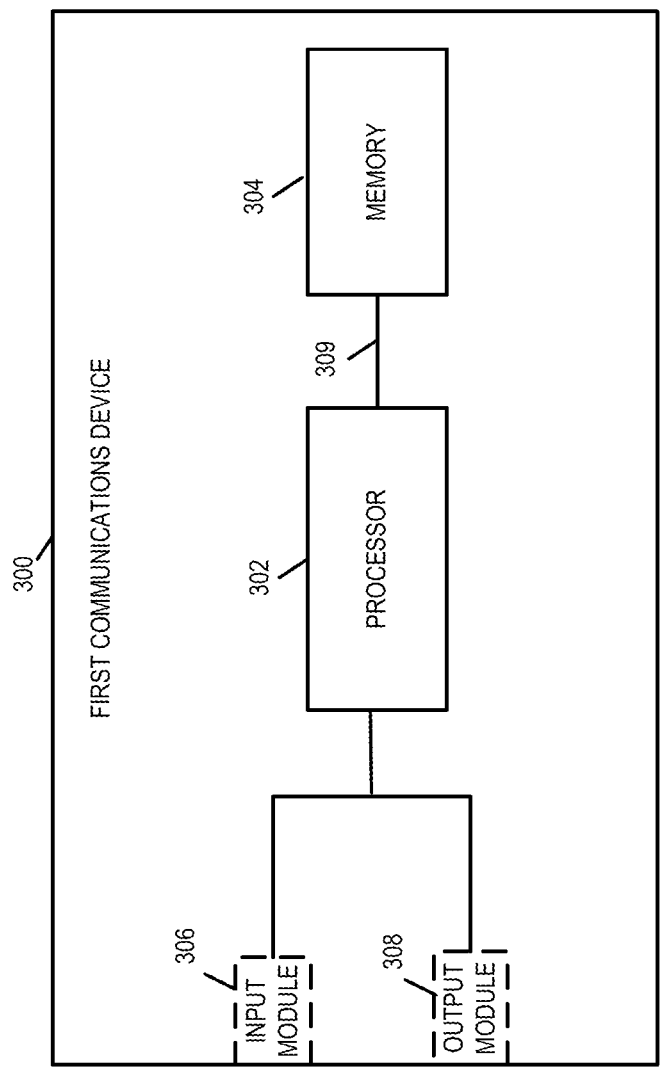
FIG. 3 is a drawing of an exemplary first communications device, in accordance with an exemplary embodiment.

FIG. 3 is a drawing of an exemplary first communications device 300, in accordance with an exemplary embodiment. Exemplary communications device 300 is, e.g., one of the wireless communications devices of FIG. 1. Exemplary communications device 300 may, and sometimes does, implement a method in accordance with flowchart 200 of FIG. 2.

Communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to generate an expression from a first public key and an additional input, said first public key corresponding to a private key known to said first communications device. Processor 302 is further configured to transmit the generated expression on a communications channel used for discovery. In some embodiments, said communications channel used for discovery corresponds to discovery time intervals in a peer to peer communications system. In various embodiments, processor 302 is configured to wirelessly transmit said expression as part of being configured to transmit said expression. The additional input, in some embodiments, is one of a random number and a time dependent input value.

Processor 302, in some embodiments, is configured to perform a one-way hash operation using said first public key and said additional input as inputs to the one-way hash operation, an output of said hash operation being said generated expression, as part of being configured to generate an expression. In some embodiments, the output of said hash operation is limited to a predetermined number of bits; and processor 302 is configured to transmit different portions of said expression in different peer discovery time periods, as part of being configured to transmit the generated expression.

Processor 302, in some embodiments, is configured to obtain said first public key from a certificate including said private key and one of a device or user identifier. Processor 302, in various embodiments, is further configured to receive said certificate from a certificate authority. Processor 302, in some embodiments, is configured to internally generate said certificate. In some embodiments, said certificate is stored in memory included in said first communications device by a manufacturer of said first communications device; and processor 302 is configured to retrieve said stored certificate from memory.

Processor 302 is further configured to: receive a signal from a second communications device; sign a communication using said private key; and send the signed communication to said second communications device. Said communication, in some embodiments, includes at least one of: i) said public key and ii) said device or user identifier. The signed communication, in various embodiments, further includes: hash information, said hash information including a hash function used to perform said hash operation and at least one input to said hash operation used to generate said expression.

In some embodiments, said device or user identifier to which the first public key corresponds is a member of a group; and processor 302 is configured to use a second public key corresponding to a second member of said group in addition to said first public key to derive said expression, as part of being configured to generate an expression. In some such embodiments, processor 302 is configured to perform a one-way hash operation using said first and second public keys and said additional input as inputs to the one-way hash operation, an output of said hash operation being said generated expression, as part of being configured to generate an expression.

Figure 4:
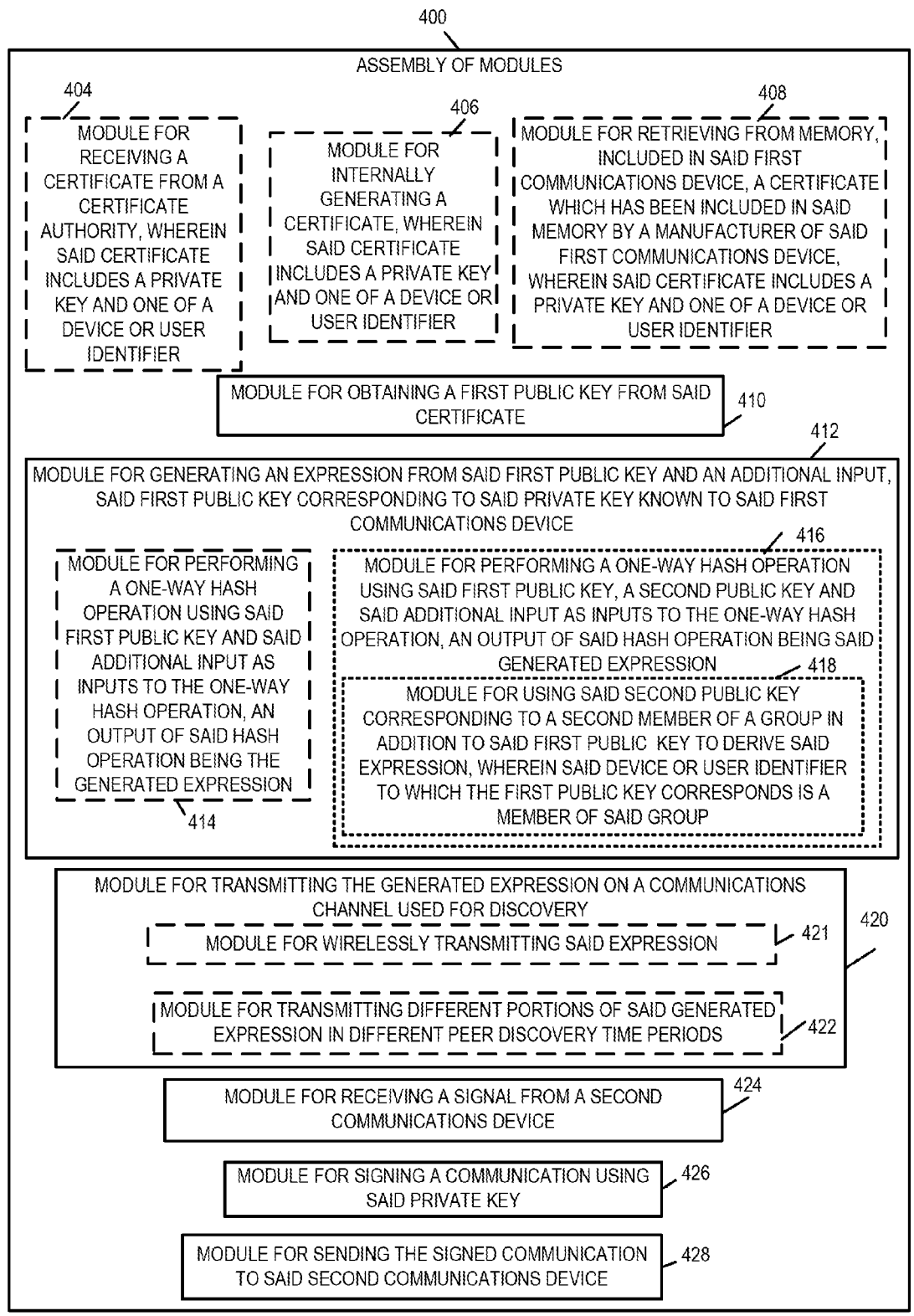
FIG. 4 is an assembly of modules which can, and in some embodiments is, used in the first communications device illustrated in FIG. 3.

FIG. 4 is an assembly of modules 400 which can, and in some embodiments is, used in the first communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the first communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the first communications device 300 or elements therein such as the processor 302, to perform the functions of the corresponding steps illustrated in the method flowchart 200 of FIG. 2.

Assembly of modules 400 includes one or more of modules 404, 406 and 408. Module 404 is a module for receiving a certificate from a certificate authority, wherein said certificate includes a private key and one of a device or user identifier. Module 406 is a module for internally generating a certificate, wherein said certificate include a private key and one of a device or user identifier. Module 408 is a module for retrieving from memory, included in said first communications device, a certificate which had been included in said memory by a manufacturer of said first communications device, wherein said certificate includes a private key and one of device or user identifier.

Assembly of modules 400 further includes: a module 410 for obtaining a first public key from said certificate, a module 412 for generating an expression from said first public key and an additional input, said first public key corresponding to said private key known to said first communications device and a module 420 for transmitting the generated expression on a communications channel used for discovery. In some embodiments, the additional input is one of a random number and a time dependent input value. In various embodiments, the communications channel used for discovery corresponds to discovery time intervals in a peer to peer communications system.

In some embodiments, module 412 includes module 414 for performing a one-way hash operation using said first public key and said additional input as inputs to the one-way hash operation, an output of said hash operation being the generated expression. In various embodiments, assembly of modules 412 includes module 416 for performing a one-way hash operation using said first public key, a second public key and said additional input as inputs to the one-way hash operation, an output of the one-way hash operation being said generated expression. In some embodiments, module 416 includes module 418 for using a second public key corresponding to a second member of a group in addition to said first public key to derive said expression, wherein said device or user identifier to which the first public key corresponds is a member of said group.

In various embodiments, module 420 includes module 421 for wirelessly transmitting said expression. Module 420, in some embodiments, includes module 422 for transmitting different portions of said generated expression in different peer discovery time periods. In some such embodiments, the output of the hash operation is limited to a predetermined number of bits.

Assembly of modules 400 further includes a module 424 for receiving a signal from a second communications device, a module 426 for signing a communication using said private key and a module 428 for sending the signed communications to said second communications device. In various embodiments, the communication includes at least one of: i) said public key and ii) said device or user identifier. In some embodiments, the signed communications further includes hash information, said hash information including a hash function and at least one input to the hash operation used to generate the expression. In some embodiments, the signed communications further includes hash information, said hash information including information used to identify or derive a hash function and at least one input to the hash operation used to generate the expression.

Figure 5:
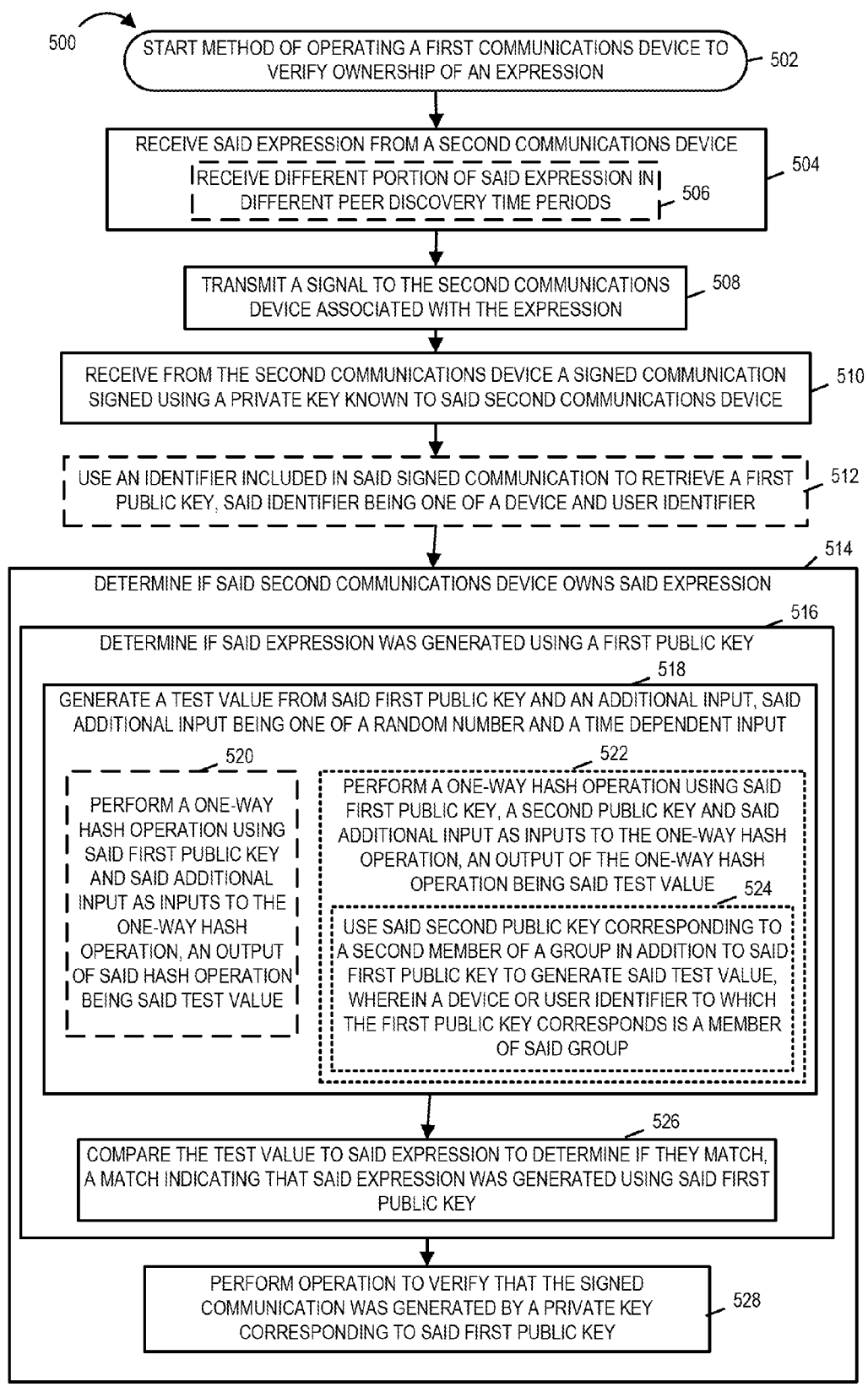
FIG. 5 is a flowchart of an exemplary method of operating a first communications device in accordance with an exemplary embodiment.

FIG. 5 is a flowchart 500 of an exemplary method of operating a first communications device to verify ownership of an expression. Operation starts in step 502, where the first communications device is powered on and initialized and proceeds to step 504. In step 504 the first communications device receives said expression from a second communications device. In some embodiments, step 504 includes substep 506 in which the first communications device receives different portions of said expression in different peer discovery time periods. In some such embodiments, the output of the hash expression is limited to a predetermined number of bits. Operation proceeds from step 504 to step 508.

In step 508 the first communications device transmits a signal, e.g., a request for a signed communication, to the second communications device associated with the expression. Operation proceeds from step 508 to step 510. In step 510 the first communications device receives from the second communications device a signed communication signed using a private key known to said second communications device. In some embodiments, a first public key, which corresponds to the private key, is included in the signed communication. In various embodiments, the signed communication includes a plurality of public keys to be used to generate a test value. The signed communication, in various embodiments, includes hash information, said hash information indicating a one-way hash function to be used to generate a test value. The signed communication, in various embodiments, includes hash information, said hash information indicating information used to identify or derive a one-way hash function to be used to generate a test value. In some embodiments, the signed communication includes each of the parameters used to generate a test value as well as the detailed description of the mathematical function used for the hash used to generate the test value.

In some embodiments, operation proceeds from step 510 to step 512, while in other embodiments, operation proceeds from step 510 to step 514. Returning to step 512, in step 512 the first communications device uses an identifier included in said signed communication to retrieve said first public key, said identifier being one of a device and user identifier. In various embodiments, the first public key is retrieved from memory of the first communication device. In some embodiments, the first public key is retrieved from another source, e.g., a public key server. Operation proceeds from step 512 to step 514.

In step 514 the first communications device determines if said second communications device owns said expression. Step 514 includes step 516 and step 528. In step 516, the first communications device determines if said expression was generated using a first public key. Step 516 includes steps 518 and 526. In step 518 the first communications device generates a test value from said first public key and additional input, said additional input being one of a random number and a time dependent input.

In some embodiments, step 518 includes one of step 520 and 522. In step 520 the first communications device performs a one-way hash operation using said first public key and said additional input as inputs to the one way hash operation, and output of the hash operation being said test value. In step 522 the first communications device performs a one-way hash operation using said first public key, a second public key and said additional input as inputs to the one-way hash operation, an output of the one way hash operation being said test value. Step 522 includes step 524 in which the first communications device uses said second public key corresponding to a second member of a group in addition to said first public key to generate said test value, wherein a device of user identifier to which the first public key corresponds is a member of said group.

Operation proceeds from step 518 to step 526 in which the first communications device compares the test value to said expression to determine if they match, a match indicating that said expression was generated using said first public key.

Operation proceeds from step 516 to step 528. In step 528 the first communications device performs an operation to verify that the signed communication was generated by a private key corresponding to said first public key, e.g., the first communications device performs a signature verification using a standard public-private key verification method.

In some embodiments, in which the second communications device is a member of said group, the exemplary method may, and sometimes does, includes a step in which the first communications device transmits a signal to the second member of said group and a step in which in the first communications device receives from the second member of said group a second signed communication signed using a second private key known to the second member of the group, e.g., the second private key corresponding to the second public key. In some such embodiments, the test value is generated using information recovered from both the signed communication and the second signed communication. In some embodiments, multiple test values are generated and tested against the received expression, e.g., a first test value using information recovered from the signed communication from the second communications device and a second test value using information recovered from the second signed communication from the second member of said group. In various embodiments in which a second signed communication is received from the second member of said group, the first communication device also performs an operation to verify that the second signed communication was generated by a second private key corresponding to the second public key.

Figure 6:
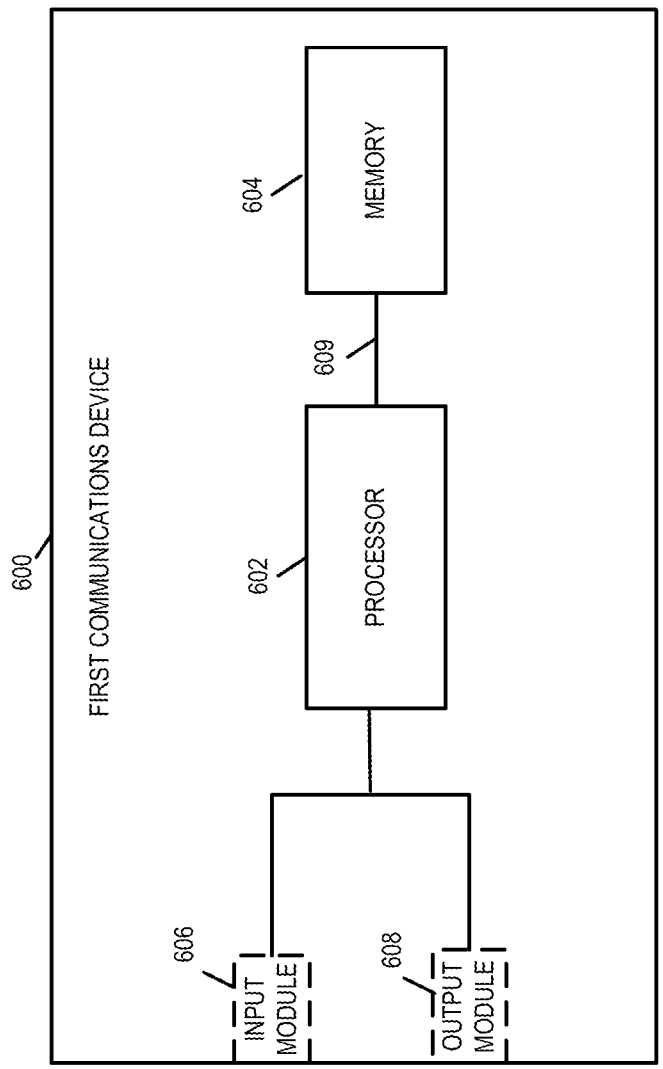
FIG. 6 is a drawing of an exemplary first communications device, in accordance with an exemplary embodiment.

FIG. 6 is a drawing of an exemplary first communications device 600, in accordance with an exemplary embodiment. Exemplary communications device 600 is, e.g., one of the wireless communications devices of FIG. 1. Exemplary communications device 600 may, and sometimes does, implement a method in accordance with flowchart 400 of FIG. 4.

Communications device 600 includes a processor 602 and memory 604 coupled together via a bus 609 over which the various elements (602, 604) may interchange data and information. Communications device 600 further includes an input module 606 and an output module 608 which may be coupled to processor 602 as shown. However, in some embodiments, the input module 606 and output module 608 are located internal to the processor 602. Input module 606 can receive input signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output.

Processor 602 is configured to: transmit a signal to a second communications device associated with an expression; receive from the second communications device a signed communication signed using a private key known to said second communications device; and determine if said second communication device owns said expression. Processor 602 is configured to: determine if said expression was generated using a first public key and verify that the signed communication was generated by a private key corresponding to said first public key, as part of being configured to determine if said second communication device owns said expression.

Processor 602 is further configured to: generate a test value from said first public key and an additional input, said additional input being one of a random number and a time dependent input value; and compare the test value to said expression to determine if they match, a match indicating that said expression was generated using said first public key, as part of being configured to determine if said expression was generated using a first public key.

In some embodiments, said first public key may be, and sometimes is, included in said signed communication, and processor 602 is further configured to recover the first public key from the signed communication. Processor 602, in some embodiments, is further configured to: use an identifier included in said signed communication to retrieve, e.g., from memory or another source such as a public key server, said first public key, said identifier being one or a device and user identifier.

In some embodiments, processor 602 is further configured to: perform a one-way hash operation using said first public key and said additional input as inputs to the one-way hash operation, an output of said hash operation being said test value, as part of being configured to generate said test value. In various embodiments, the output of said hash operation is limited to a predetermined number of bits; and processor 602 is further configured to receive different portions of said expression in different peer discovery time periods, as part of being configured to receive the expression.

In some embodiments, said signed communication further includes: hash information, said hash information indicating a one-way hash function to be used to generate said test value. In some such embodiments, processor 602 is configured to recover the hash information from the signed communication.

In some embodiments, a device or user identifier to which the first public key corresponds may be, and sometimes is, a member of a group; and processor 602 is configured to use a second public key corresponding to a second member of said group in addition to said first public key to generate said test value, as part of being configured to generate a test value. In some such embodiments, processor 602 is configured to perform a one-way hash operation using said first and second public keys and said additional input as inputs to the one-way hash operation, an output of said hash operation being said test value, as part of being configured to generate a test value.

Figure 7:
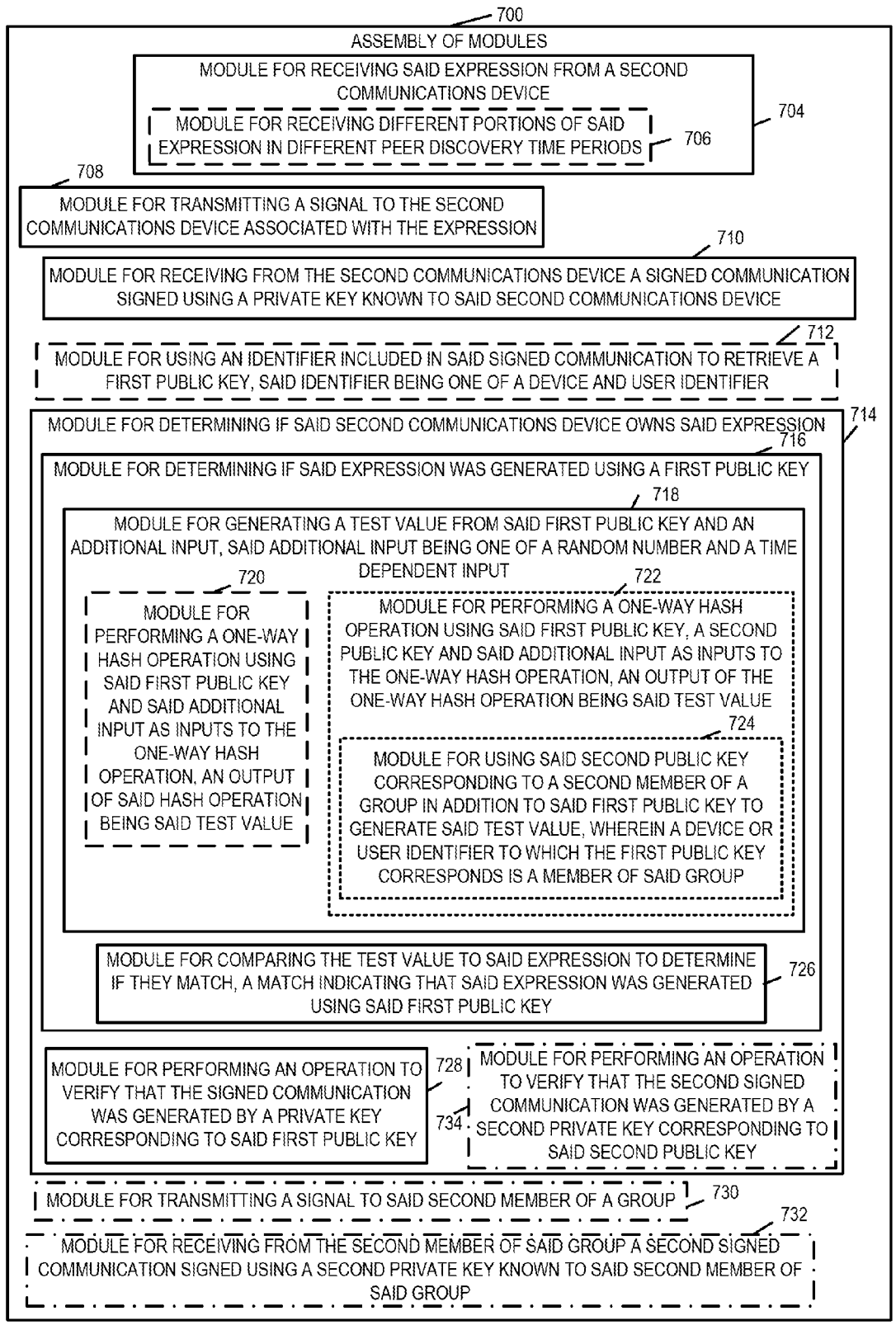
FIG. 7 is an assembly of modules which can, and in some embodiments is, used in the first communications device illustrated in FIG. 6.

FIG. 7 is an assembly of modules 700 which can, and in some embodiments is, used in the first communications device 600 illustrated in FIG. 6. The modules in the assembly 700 can be implemented in hardware within the processor 602 of FIG. 6, e.g., as individual circuits. Alternatively, the modules may be implemented in software and stored in the memory 604 of the first communications device 600 shown in FIG. 6. While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In some embodiments, processor 602 is configured to implement each of the modules of the assembly of modules 700. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the first communications device 600 or elements therein such as the processor 602, to perform the functions of the corresponding steps illustrated in the method flowchart 500 of FIG. 5.

Assembly of modules 700 includes a module 704 for receiving said expression from a second communications device, a module 708 for transmitting a signal, e.g., a request for a signed communication, to the second communications device associated with the expression, a module 710 for receiving from the second communications device a signed communication signed using a private key known to said second communications device, and a module 714 for determining if said second communications device owns said expression. In various embodiments, a first public key corresponding to the first private key is included in the signed communication received by module 710. In some embodiments, the signed communication received by module 710 includes hash information, said hash information indicating a one-way hash function to be used to generate a test value.

In some embodiments, assembly of modules 700 further includes a module 712 for using an identifier included in said signal communication to retrieve, e.g., from memory or another source such as a public key server, a first public key, said identifier being one of a device and user identifier.

In some embodiments, module 704 includes a module 706 for receiving different portions of said expression in different peer discovery time periods. In some embodiments, the output of the hash operation is limited to a predetermined number of bits, and module 706 receives different portions of said expression in different peer discovery time periods.

Module 714 includes a module 716 for determining if said expression was generated using a first public key and a module 728 for performing an operation to verify that the signed communication was generated by a private key corresponding to said first public key. Module 716 includes a module 718 for generating a test value from said first public key and an additional input, said additional input being one of a random number and a time dependent variable, and a module 726 for comparing the test value to said expression to determine if they match, a match indicating that said expression was generated using said first public key.

In some embodiments, module 718 includes one or more of module 720 for performing a one-way hash operation using said first public key and said additional input as inputs to the one-way hash operation, an output of said hash operation being said test value and a module 722 for performing a one-way hash operation using said first public key, a second public key and said additional input as inputs to the one-way hash operation, an output of the one-way hash operation being said test value. Module 722 includes a module 724 for using said second public key corresponding to a second member of a group in addition to said first public key to generate said test value, wherein a device or user identifier to which the first public key corresponds is a member of said group.

In some embodiments, assembly of modules 700 further includes a module 730 for transmitting a signal, e.g., a request for a signed communication, to second member of said group, and a module 732 for receiving from the second member of said group a second signed communication signed using a second private key known to the second member of the group. The second private key known to the second member of the group is, e.g., the private key corresponding to the second public key. In some such embodiments, module 714 uses information recovered from both said first signed communications and said second signed communication in generating a test value to compare to the received expression. In various embodiments, module 714 for determining if said second communication device owns said expression further includes a module 734 for performing an operation to verify that the second signed communication was generated by a second private key corresponding to the second public key.

Figure 8:
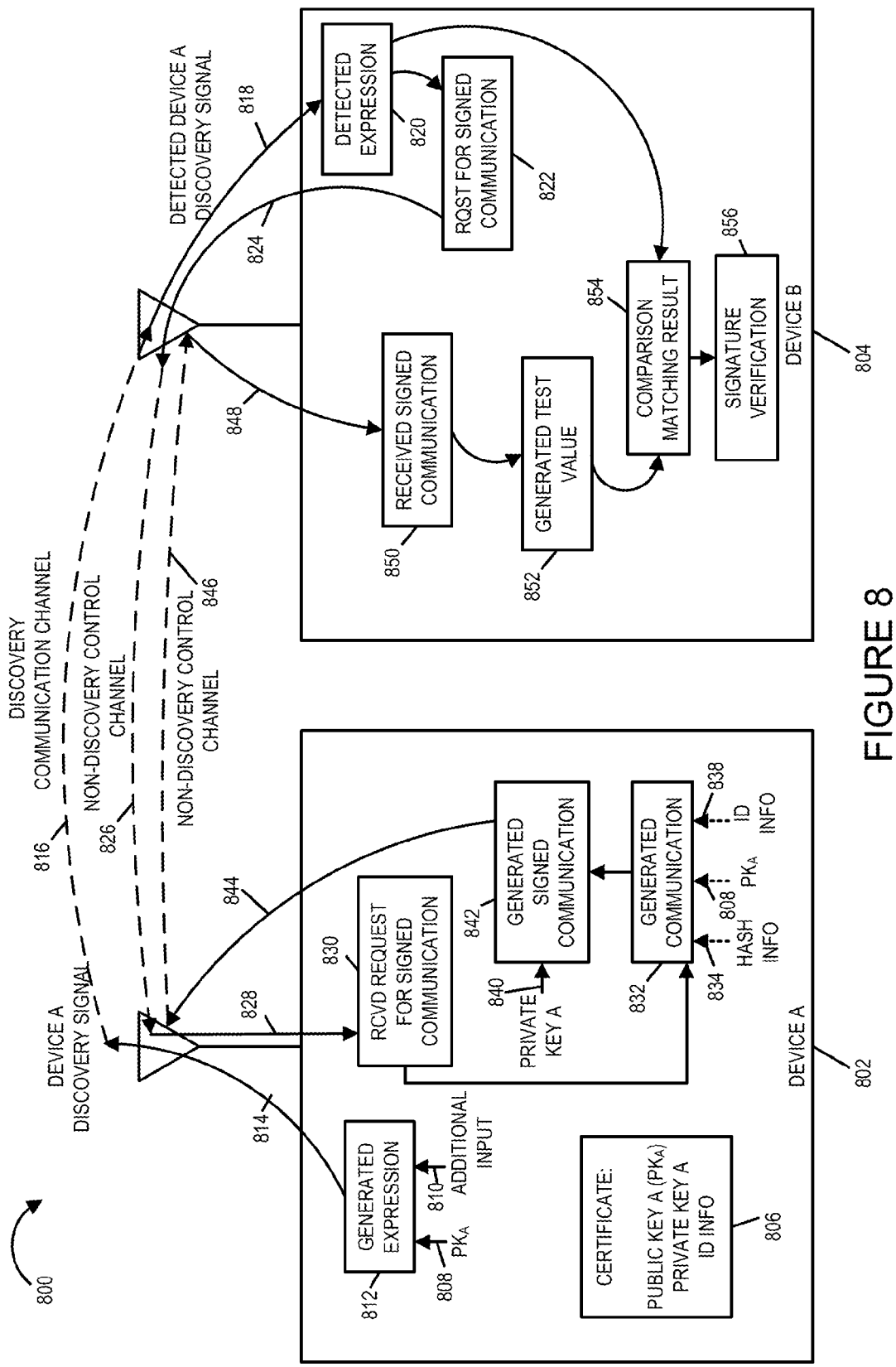
FIG. 8 is a drawing illustrating some exemplary signaling exchanged and intermediary results relating to deriving, communicating and verifying ownership of an expression in accordance with one embodiment.

FIG. 8 is a drawing 800 illustrating some exemplary signaling exchanged and intermediary results in regard to generating, communicating and verifying ownership of an expression in accordance with one embodiment. Drawing 800 illustrates two exemplary wireless peer to peer communications devices (device A 802, device B 804). Devices 802, 804 are, e.g., any of the wireless communications devices of system 100 of FIG. 1. Devices 802, 804 may implement one or more methods in accordance with flowchart 200 of FIG. 2 and/or flowchart 500 of FIG. 5. Devices 802, 804 may be implemented in accordance with one of more of elements described in FIGS. 3, 4, 6 and/or 7.

Device A 802 includes a certificate 806 which includes a public key ($PK_A$), a corresponding private key A, and identification information. The identification information is, e.g., one of a device or user identifier. Device A 802 desires to transmit discovery information; therefore, device A 802 generates an expression 812. The expression is generated by device A 802 as a function of its public key $PK_A$ 808 and additional input. In some embodiments generating the expression includes performing a one-way hash operation using $PK_A$ and the additional input to the one-way hash operation, and an output of the one-way hash operation is the generated expression. Device A 802 generates a discovery signal 814 to convey the generated expression 812. Device A 802 transmits its discovery signal 814 over a discovery communications channel 816 in the air link resources of the peer to peer recurring timing-frequency structure being implemented. Device B 804, which has been monitoring for discovery signals from other devices, detects device A discovery signal as indicated by arrow 818. Device B 804 recovers the detected expression as indicated by block 820.

Device B 804 would like to verify that device A 802 has ownership of the expression. Device B 804 generates a request for a signed communication 822 and transmits request signal 824 to device A 802 over non-discovery control channel 826. In some embodiments, the non-discovery control channel 826 is one of: a paging channel, a link establishment channel, and a post link establishment control channel. Device A 802 receives the request signal as indicated by arrow 828 and recovers the received request for signed communication as indicated by block 830. In response, device A 802 generates a communication 832 using one or more of: hash information 834, $PK_A$ 808, and ID information 838 as inputs. The ID information 838 is, e.g., a device and/or user identifier. The hash information 834 includes, e.g., information including a hash function used to perform the hash operation used to generate generated expression 812 and at least one input used to generate expression 812. As another example, the hash information 834 includes, e.g., information used to identify a hash function used to perform the hash operation used to generate generated expression 812 and at least one input used to generate expression 812.

Device A 802 then signs the generated communication 832 using its private key A 840 resulting in generated signed communication 842. Device A 802 generates and transmits a signal 844 conveying the generated signed communication over non-discovery control channel 846. In some embodiments, the non-discovery control channel 846 is one of: a paging response channel, a link establishment channel, and a post link establishment control channel. Device B 804 receives the signal carrying the signed communication as indicated by received signal 848. Device B 804 recovers the received signed communication as indicated by block 850.

Device B 804 uses information communicated by the received signed communication to generate a test value as indicated by block 852. The generated test value is compared to the detected expression 820 and a comparison matching result 854 is obtained. In this case, device A 802 owns the expression which was transmitted, and the private key used to generate the signed communication matched the public key originally used to generate the transmitted expression. In this case the generated test value 852 matches the detected expression 820. Device B 804 also performs a signature verification as indicated by block 856, e.g., using standard public private key verification methods.

Figure 9:
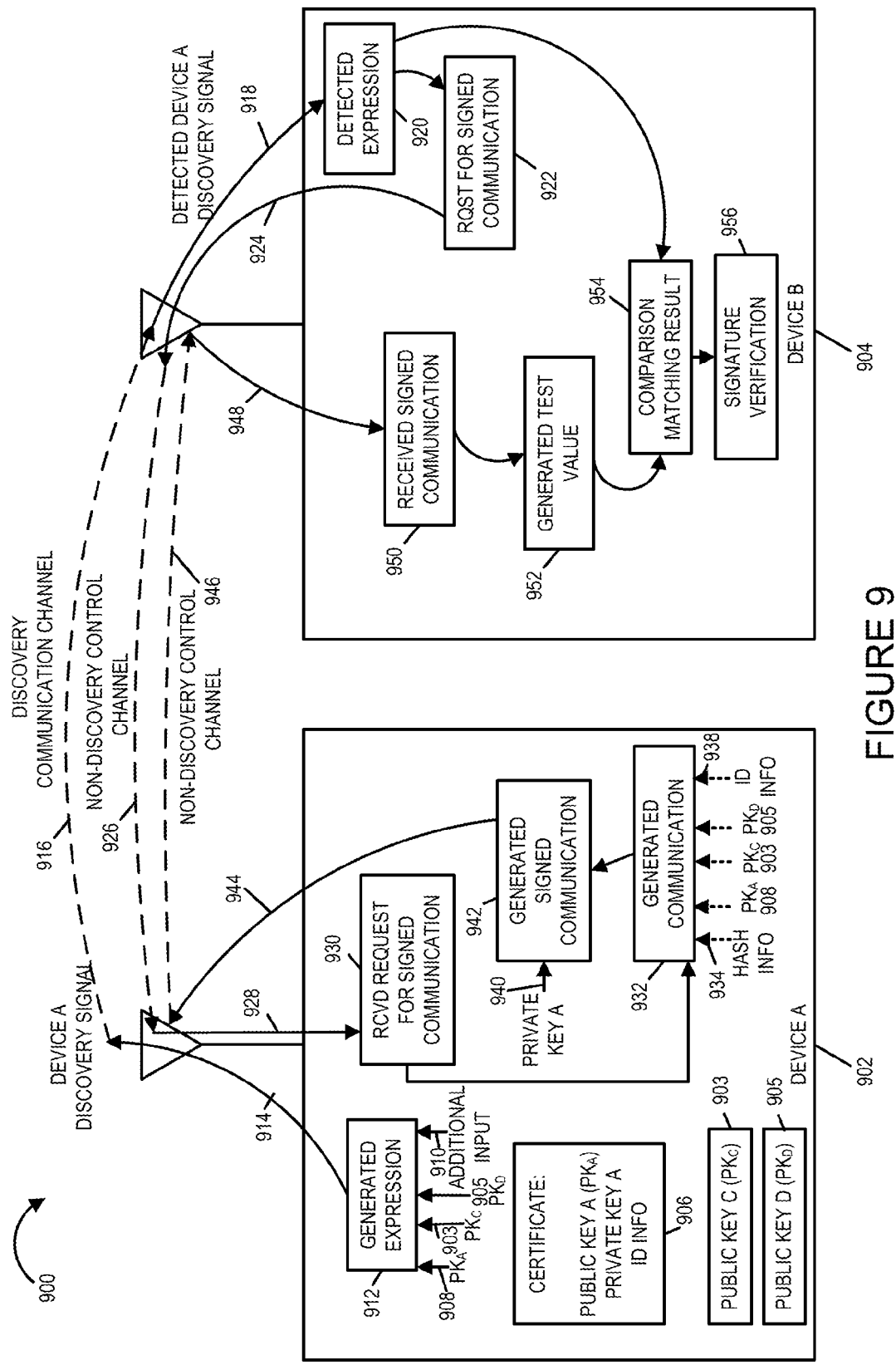
FIG. 9 is a drawing illustrating some exemplary signaling exchanged and intermediary results relating to deriving, communicating and verifying ownership of an expression in accordance with one embodiment, wherein said generated expression is based on group information.

FIG. 9 is a drawing 900 illustrating some exemplary signaling exchanged and intermediary results in regard to generating, communicating and verifying ownership of an expression in accordance with one embodiment. Drawing 900 illustrates two exemplary wireless peer to peer communications devices (device A 902, device B 904). Devices 902, 904 are, e.g., any of the wireless communications devices of system 100 of FIG. 1. Devices 902, 904 may implement one or more methods in accordance with flowchart 200 of FIG. 2 and/or flowchart 500 of FIG. 5. Devices 902, 904 may be implemented in accordance with one of more of elements described in FIGS. 3, 4, 6 and/or 7.

Device A 902 includes a certificate 906 which includes a public key ($PK_A$), a corresponding private key A, and identification information. The identification information is, e.g., one of a device or user identifier. Device A 902 is a member of group including device C and device D. Device A 902 includes a public key for device C ($PK_C$) 903 and a public key for device D ($PK_D$) 905. Device A 902 desires to transmit discovery information; therefore, device A 902 generates an expression 912. The expression is generated by device A 902 as a function of its public key $PK_A$ 908, $PK_C$ 903, $PK_D$ 910 and additional input. In some embodiments the generating the expression includes performing a one-way hash operation using $PK_A$, $PK_C$, $PK_D$ and the additional input to the one-way hash operation, and an output of the one-way hash operation is the generated expression. Device A 902 generates a discovery signal 914 to convey the generated expression 912. Device A 902 transmits its discovery signal 914 over a discovery communications channel 916 in the air link resources of the peer to peer recurring timing-frequency structure being implemented. Device B 904, which has been monitoring for discovery signals from other devices, detects the device A discovery signal as indicated by arrow 918. Device B 904 recovers the detected expression as indicated by block 920.

Device B 904 would like to verify that device A 902 has ownership of the expression. Device B 904 generates a request for a signed communication 922 and transmits request signal 924 to device A 902 over non-discovery control channel 926. In some embodiments, non-discovery control channel 926 is one of: a paging channel, a link establishment channel, and a post link establishment control channel. Device A 902 receives the request signal as indicated by arrow 928 and recovers the received request for signed communication as indicated by block 930. In response, device A 902 generates a communication 932 using one or more of: hash information 934, $PK_A$ 908, $PK_C$ 903, $PK_D$ 905, and ID information 938 as inputs. The ID information 938 is, e.g., a device and/or user identifier. The hash information 934 includes, e.g., information including a hash function used to perform the hash operation used to generate generated expression 912 and at least one input used to generate expression 912. As another example, the hash information 934 includes, e.g., information used to identify a hash function used to perform the hash operation used to generate generated expression 912 and at least one input used to generate expression 912.

Device A 902 then signs the generated communication 932 using its private key A 940 resulting in generated signed communication 942. Device A 902 generates and transmits a signal 944 conveying the generated signed communication over non-discovery control channel 946. In some embodiments, the non-discovery control channel 946 is one of: a paging response channel, a link establishment channel, and a post link establishment control channel. Device B 904 receives the signal carrying the signed communication as indicated by received signal 948. Device B 904 recovers the received signed communication as indicated by block 950.

Device B 904 uses information communicated by the received signed communication 950 to generate a test value as indicated by block 952. The generated test value is compared to the detected expression 920 and a comparison matching result 954 is obtained. In this case, device A 902 owns the expression which was transmitted, and the private key used to generate the signed communication matched the public key originally used to generate the transmitted expression. In this case the generated test value 952 matches the detected expression 920. Device B 904 also performs a signature verification on the received signed communication from device A 902 as indicated by block 956, e.g., using standard public private key verification methods.

Figure 10:
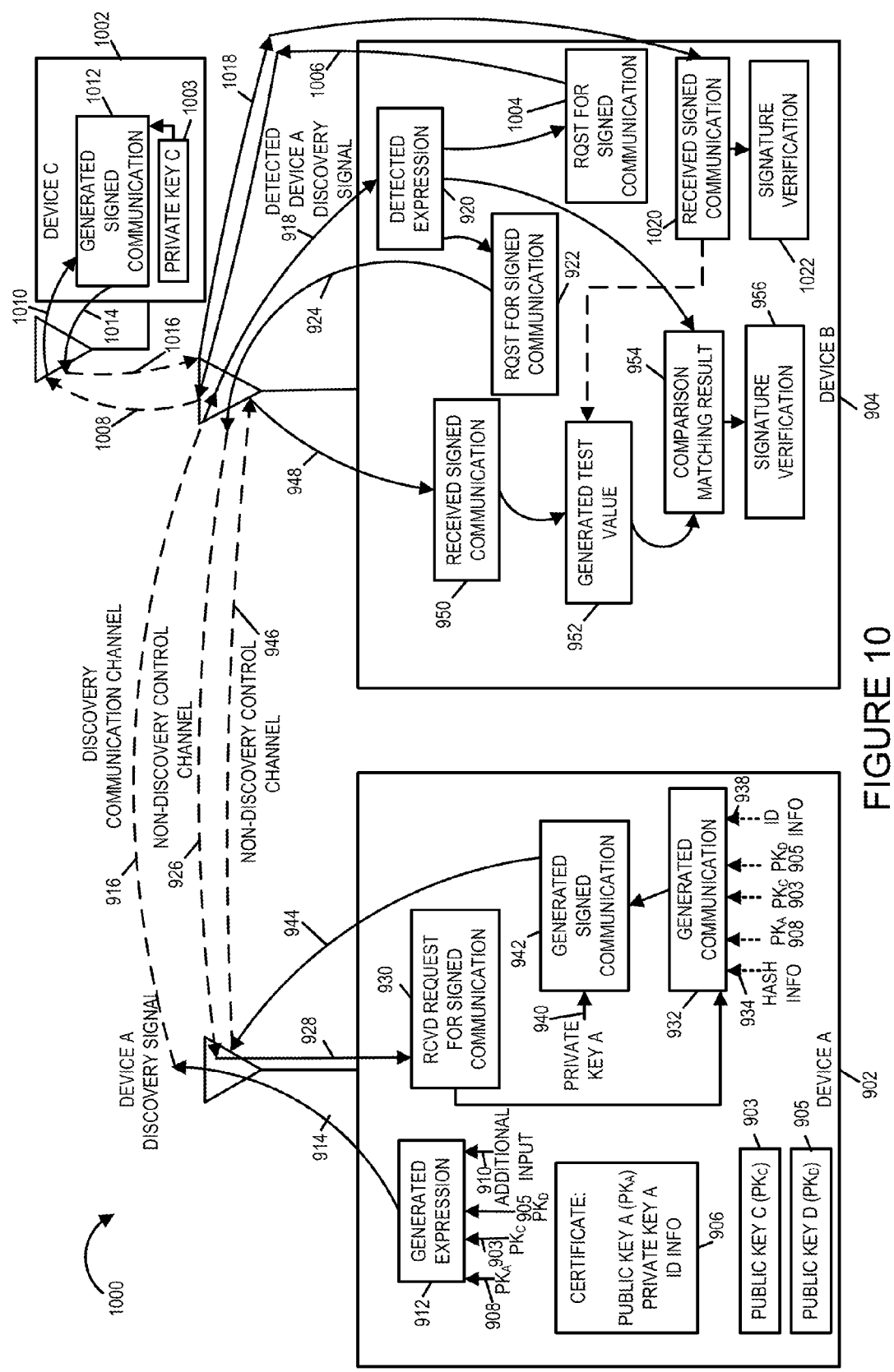
FIG. 10 is a drawing illustrating some exemplary signaling exchanged and intermediary results relating to deriving, communicating and verifying ownership of an expression in accordance with one embodiment, wherein said generated expression is based on group information and wherein signed communications are received from two group members as part of the verification.

FIG. 10 is a drawing 1000 illustrating some exemplary signaling exchanged and intermediary results in regard to generating, communicating and verifying ownership of an expression in accordance with one embodiment, wherein said generated expression is based on group information and wherein signed communications are received from two group members as part of the verification. Drawing 1000 illustrates three exemplary wireless peer to peer communications devices (device A 902, device B 904, device C 1002). Devices 902, 904, 1002 are, e.g., any of the wireless communications devices of system 100 of FIG. 1. Devices 902, 904, 1002 may implement one or more methods in accordance with flowchart 200 of FIG. 2 and/or flowchart 500 of FIG. 5. Devices 902, 904 may be implemented in accordance with one of more of elements described in FIGS. 3, 4, 6 and/or 7.

Device A 902 includes a certificate 906 which includes a public key ($PK_A$), a corresponding private key A, and identification information. The identification information is, e.g., one of a device or user identifier. Device A 902 is a member of group including device C and device D. Device A 902 includes a public key for device C ($PK_C$) 903 and a public key for device D ($PK_D$) 905. Device C 1002 includes a certificate including public key C, private key C 1003, and ID information. Device C 1002 also includes public key A and public key D. Device A 902 desires to transmit discovery information; therefore, device A 902 generates an expression 912. The expression is generated by device A 902 as a function of public key $PK_A$ 908, $PK_C$ 903, $PK_D$ 905 and additional input 910. In some embodiments generating the expression includes performing a one-way hash operation using $PK_A$, $PK_C$, $PK_D$ and the additional input to the one-way hash operation, and an output of the one-way hash operation is the generated expression. Device A 902 generates a discovery signal 914 to convey the generated expression 912. Device A 902 transmits its discovery signal 914 over a discovery communications channel 916 in the air link resources of the peer to peer recurring timing-frequency structure being implemented. Device B 904, which has been monitoring for discovery signals from other devices, detects device A discovery signal as indicated by arrow 918. Device B 904 recovers the detected expression as indicated by block 920.

Device B 904 would like to verify that device A 902 has ownership of the expression. Device B 904 generates a request for a signed communication 922 and transmits request signal 924 to device A 902 over non-discovery control channel 926. In some embodiments, non-discovery control channel 926 is one of: a paging channel, a link establishment channel, and a post link establishment control channel. Device A 902 receives the request signal as indicated by arrow 928 and recovers the received request for signed communication as indicated by block 930. In response, device A 902 generates a communication 932 using one or more of: hash information 934, $PK_A$ 908, $PK_C$ 903, $PK_D$ 905, and ID information 938 as inputs. The ID information 938 is, e.g., a device and/or user identifier. The hash information 934 includes, e.g., information including a hash function used to perform the hash operation used to generate generated expression 912 and at least one input used to generate expression 912. As another example, the hash information 934 includes, e.g., information used to identify a hash function used to perform the hash operation used to generate generated expression 912 and at least one input used to generate expression 912.

Device A 902 then signs the generated communication 932 using its private key A 940 resulting in generated signed communication 942. Device A 902 generates and transmits a signal 944 conveying the generated signed communication over non-discovery control channel 946. In some embodiments, the non-discovery control channel 946 is one of: a paging response channel, a link establishment channel, and a post link establishment control channel. Device B 904 receives the signal carrying the signed communication as indicated by received signal 948. Device B 904 recovers the received signed communication as indicated by block 950.

In response to detected expression 920, device B 904 also generates a request for a signed communication from another member of the group to which device A 902 belongs. In this example, device B 904 generates request for a signed communication to device C 1004. For example, device C 1002 may happen to be in the local vicinity of device B 904 at this time and is available to assist in verification. Device B 904 and transmits request signal 1006 carrying request 1004 to device C 1002 over non-discovery control channel 1008. Device C 1002 receives the request signal as indicated by arrow 1010 and recovers the received request for signed communication. In response, device C 1002 generates a communication using one or more of: hash information, $PK_A$, $PK_B$, $PK_C$, and ID information as inputs.

Device C 1002 then signs the generated communication using its private key C 1003 corresponding to its public key C $PK_C$, resulting in generated signed communication 1012. Device C 1002 generates and transmits a signal 1014 conveying the generated signed communication over non-discovery control channel 1016. Device B 904 receives the signal carrying the signed communication as indicated by received signal 1018. Device B 904 recovers the received signed communication as indicated by block 1020.

Device B 904 uses information communicated by the received signed communication 950 and/or received signed communication 1020 to generate a test value as indicated by block 952. The generated test value is compared to the detected expression 920 and a comparison matching result 954 is obtained. In this case, device A 902 owns the expression which was transmitted, and the private key used to generate the signed communication matches the public key originally used to generate the transmitted expression. In this case the generated test value 952 matches the detected expression 920. Device B 904 also performs a signature verification on the received signed communication from device A 902 as indicated by block 956, e.g., using standard public private key verification methods. In addition, device B 904 also performs a signature verification on the received signed communication from device C 1002 as indicated by block 1022, e.g., using standard public private key verification methods.

Various embodiments are directed to methods and apparatus which allow deriving a set of expressions from a certificate. The set of expressions, in some embodiments, is tightly bound to unique parameters in the certificate, e.g., the public key, which validity, can be verified by checking the signature (s) on the certificate (i.e., signed by at least one certificate authority (CA)), and its ownership verified by checking the signature of the message carrying the certificate. There are two main advantages behind deriving expressions from a certificate:

1. It is very difficult, if not impossible, to impersonate the expression's owner since the first step towards verifying the expression(s) is to validate the certificate. This means that the malicious node has to provide a proof of ownership of the private-public key pair, which in turn means that it has to possess the private key which is used to sign the message carrying the certificate.
2. Verifying the set of expressions becomes a straightforward and cheap operation. In some embodiments, the set of expressions is validated by validating the certificate and checking the public key ownership. In some embodiments, if both tests yield positive results, then the expressions are easily checked via a simple one, or a few, one-way hash function(s).

A third advantage for using a certificate to derive an expression is that a certificate can also be, and in some embodiments is, self-generated. In such scenario, the certificate verification is reduced to a proof of ownership of the public key, i.e., one signature only. Such a scenario may apply, and in some embodiments is used, in situations where a certificate authority (CA) is not available and/or accessible.

A fourth advantage for using a certificate to derive an expression, is the possibility to use more than one certificate to derive a particular expression. Such a procedure may be referred to as "chaining" as it allows a predefined set of people, each having his/her own private-public key pair, to own a particular expression.

In addition to using the PK to generate the expression(s), in some embodiments, there are other important parameters, which can be used for the same purpose. For example, the HIT (i.e., hash (PK)) is a 128-bit parameter which can be inserted in the one-way hash function together with other random values. In this case, the expression would be the result of the hash. It should be noted that the certificate usually carries the HIT as the owner's identity (or at least one identity).

Another important parameter is the hash of the certificate itself, e.g., the first 128 bits.

It is also possible to derive a parameter(s) from the certificate from which, the expression(s) can be derived. In fact, as long as the ownership of such parameter(s) can be proved then it can be used. Such virtual layering between the certificate and the expression can be useful for privacy purposes (i.e., case of group expression) as the sender will not have to disclose a priori its identities (i.e., mainly not its public key) before checking the certificate of the other peer (e.g., when pairing).

A common feature in the above set of parameters is that each of them can be verified upon validating the certificate and the signature, i.e., ownership of the private-public key pair.

A generic way to create an expression is to apply the following equation:

$$(Y)=\text{First}[m,\text{Hash}(M|\text{RAN})] \quad (1)$$

Where:
First (size, input) indicates truncation of the "input" data so that only the first "size", i.e., m, bits remain to be used.
Hash( ) is a one-way hash function
M is a parameter to be validated by the receiver. It can represent the sender's public key, a HIT, a hash of the certificate, etc.
"|" indicates a bytewise concatenation
RAN is a random 128-bit parameter
Note: it follows immediately from (1) that an unlimited number of (Y) can be derived from PK. Such feature enables the sender to derive as much expressions as needed without weakening the level of its security.

Various embodiments are directed to communications systems, e.g., peer to peer wireless communications systems. An expression can be, and in some embodiments is, derived from a device certificate. In some peer to peer communications systems, expressions play a key role in announcing both presence and proximity and also to advertise specific information.

However, sending (X, Y) to a set of receivers does not preclude a malicious sender from spoofing the pair of parameters at some stage in an attempt to confuse a set of receivers or to uncover relationship(s) in case of social networks.

Our motivation is to provide a mechanism that allows a receiver of an expression to easily validate that said expression belongs to the device transmitting it, i.e., to prevent spoofing of expressions by devices that do not own them.

Various aspects of an exemplary peer to peer protocol will be described. An expression (E) can be described as a couple of parameters (X, Y) where (X) is the information itself and (Y) is a shared key. The shared key is used to enhance the privacy of the advertising node, by incorporating it together with the current time in the hash of (X). For this purpose, the couple (X, Y) is distributed out of band to a set of receivers together with an identifier, e.g., the sender's host identity tag (HIT), which is obtained from hashing its public key (PK). Each receiver binds the pair(s) (X, Y) to the corresponding HIT. It follows that each of the receivers should be able to verify with a high degree of confidence the sender's identity prior to accepting the pair (X, Y).

It becomes clear from the above that the shared key (Y) plays a critical role in enhancing the sender's own privacy by enabling him/her to be identifiable and traceable to the set of receivers only. For a receiver outside the designed set, the advertised information will not provide any hint about the sender's identity nor the possibility to correlate between different advertisements (i.e., except in particular cases).

The suggested solution, in some embodiments, includes deriving (Y) from the sender device's certificate (e.g., the device's public key or other parameter in the certificate).

In some communications systems, e.g., some peer to peer communications systems, the following steps are used to establish communications between devices:

1) Discovery: During this process, devices discover each other, e.g., by transmitting and monitoring for "expressions".

2) Pairing: Once devices discover each other, the process of pairing is used to establish a secure communication channel between the devices.
3) Link establishment and higher layer. Once pairing is done, the high layers are initiating to allow data exchange.

Some exemplary embodiments are well suited to allow devices to prove the fact that they own a certain expression transmitted in Discovery phase, during the Pairing phase. In some embodiments, this is achieved by deriving the expression used in Discovery phase from a Certificate belonging to the source device.

Now the expression Y can be proven to belong to the source of that expression by providing the other device with the Certificate of the source and a signature that validates the ownership of said certificate.

Deriving expression (Y) from the sender's PK can be done in the following way:

$$(Y)=\text{First}[m,\text{Hash}(PK|\text{RAN})] \quad (2)$$

Where:
First (size, input) indicates truncation of the "input" data so that only the first "size", i.e., m, bits remain to be used.
Hash( ) is a one-way hash function
PK is the sender's public key
"|" indicates a bytewise concatenation
RAN is a random 128-bit parameter
Note: it follows immediately from equation (2) that an unlimited number of expression (Y) can be derived from public key (PK). Such feature enables the sender to derive as much expressions as needed without weakening the level of its security.

After deriving expression (Y), the sender shares it with its selected group of receivers together with its HIT. As mentioned earlier, it is important to sign any payload which carries such parameters. Otherwise, the receiver(s) should reject it. Each receiver binds (Y) to the sender's HIT and can start using it to derive fresh advertisements, which are supposed to be sent or to be used when paging the sender (i.e., the sender may decide not to advertise at all).

When a receiver (R) initiates a session with the sender, a security association between the two peers is established prior to exchanging any data packet. The validation of expression (Y) can occur when validating the sender's certificate. The certificate provides receiver (R) with a proof of ownership of PK. In parallel with the certificate validation, the sender can disclose the RAN parameter, which in turn enables receiver (R) to re-compute expression (Y) from the certified PK and RAN.

Deriving expression (Y) from public key (PK) prevents spoofing attack against (Y) since the malicious node has to prove also ownership of PK itself, which is supposed to be substantially difficult to achieve.

In some embodiments, the RAN(s) is (are) sent along with expression (Y) and the HIT. Note that while the HIT should be related to PK, the message carrying each of these parameters may be signed with another private key. In such case, the verification of PK enables the receiver (R) to implicitly validate immediately each of the expression (Y) that are bound to PK.

The techniques of various embodiments may be implemented using software, hardware and/or a combination of software and hardware. In some embodiments, modules are implemented as physical modules. In some such embodiments, the individual physical modules are implemented in hardware, e.g., as circuits, or include hardware, e.g., circuits, with some software. In other embodiments, the modules are implemented as software modules which are stored in memory and executed by a processor, e.g., general purpose computer. Various embodiments are directed to apparatus, e.g., stationary wireless nodes, mobile nodes such as mobile access terminals of which cell phones are but one example, access point such as base stations including one or more attachment points, servers, and/or communications systems. Various embodiments are also directed to methods, e.g., method of controlling and/or operating wireless communications devices including mobile and/or stationary nodes, access points such as base stations, server nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, generating an expression from a first public key and an additional input, said first public key corresponding to a private key known to said first communications device; and transmitting the generated expression on a communications channel used for discovery.

Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While various features are described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), GSM and/or various other types of communications techniques which may be used to provide wireless communications links, e.g., WAN wireless communications links, between access points and wireless communications device such as mobile nodes and wireless communications. The methods and apparatus may be, and in various embodiments are, used with CDMA, orthogonal frequency division multiplexing (OFDM), GSM and/or various other types of communications techniques which may be used to provide wireless communications links, e.g., direct peer to peer wireless communications links, between wireless communications devices including peer to peer interfaces. In some embodiments a wireless communications device including both a wide area network interface and a peer to peer network interface uses different communications techniques for the different interfaces, e.g., one of CDMA and GSM based techniques for the WAN interface and OFDM based techniques for the peer to peer interface. In some embodiments the access points are implemented as base stations which establish communications links with mobile nodes using CDMA, GSM and/or OFDM. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first peer to peer communications device to communicate information, the method comprising:

generating an expression from a first public key and an additional input, said expression communicating a service request, a merchandise advertisement, a merchandise request or location information, said first public key corresponding to a private key known to said first peer to peer communications device;

transmitting the generated expression during a discovery time interval on a first communications channel used for peer device discovery;

receiving, from a second peer to peer communications device which received the generated expression, a request for a signed communication;

signing a communication using said private key; and sending the signed communication to said second peer to peer communications device.

2. The method of claim 1,
wherein generating an expression includes performing a one-way hash operation using said first public key and said additional input as inputs to the one-way hash operation, said additional input being a time varying input, an output of said hash operation being said generated expression.

3. The method of claim 1,
wherein said first peer to peer communications device is a wireless communications device;
wherein transmitting the generated expression during a discovery time interval on a first communications channel used for peer device discovery includes broadcasting said expression on said wireless peer discovery communications channel; and
wherein said first public key is obtained from a certificate including said private key and one of a device or user identifier.

4. The method of claim 2,
wherein said request for a signed communication is received on a second communications channel which is different from said first communications channel used for peer device discovery.

5. The method of claim 1, wherein said signed communication includes at least one of:
i) said public key, ii) a device, or iii) a user identifier.

6. The method of claim 2, wherein said signed communication includes:
hash information, said hash information including a hash function used to perform said hash operation that was used to generate said transmitted expression and at least one input to said hash operation used to generate said expression.

7. The method of claim 3,
wherein said device or user identifier to which the first public key corresponds is a member of a group; and
wherein generating an expression includes using a second public key corresponding to a second member of said group in addition to said first public key to derive said expression.

8. The method of claim 1, wherein said signed communication includes each of a plurality of parameters used to generate said expression as well as information identifying a hash function used to generate said expression or information which can be used to derive the hash function used to generate said expression.

9. The method of claim 1 wherein said expression communicates location information.

10. The method of claim 1, wherein said expression communicates a merchandise advertisement.

11. A first peer to peer communications device to comprising:
means for generating an expression from a first public key and an additional input, said expression communicating a service request, a merchandise advertisement, a merchandise request or location information, said first public key corresponding to a private key known to said first peer to peer communications device;

means for transmitting the generated expression during a discovery time interval on a first communications channel used for peer device discovery;

means for receiving, from a second peer to peer communications device which received the generated expression, a request for a signed communication;

means for signing a communication using said private key; and means for sending the signed communication to said second peer to peer communications device.

12. The first peer to peer communications device of claim 11, wherein said means for generating an expression includes means for performing a one-way hash operation using said first public key and said additional input as inputs to the one-way hash operation, said additional input being a time varying input, an output of said hash operation being said generated expression.

13. The first peer to peer communications device of claim 11, wherein said first peer to peer communications device is a wireless communications device:
wherein said first public key is obtained from a certificate including said private key and one of a device or user identifier; and
wherein said request for a signed communication is received on a second communications channel which is different from said first communications channel used for peer device discovery.

14. A computer program product for use in a first peer to peer communications device, the computer program product comprising:
a non-transitory computer readable medium comprising:
code for causing at least one computer to generate an expression from a first public key and an additional input, said expression communicating a service request, a merchandise advertisement, a merchandise request or location information, said first public key corresponding to a private key known to said first peer to peer communications device;
code for causing said at least one computer to transmit the generated expression during a discovery time interval on a first communications channel used for peer device discovery;
code for causing said at least one computer to receive, from a second peer to peer communications device which received the generated expression, a request for a signed communication;
code for causing said at least one computer to sign a communication using said private key; and
code for causing said at least one computer to send the signed communication to said second peer to peer communications device.

15. A first peer to peer communications device comprising:
at least one processor configured to:
generate an expression from a first public key and an additional input, said expression communicating a service request, a merchandise advertisement, a merchandise request or location information, said first public key corresponding to a private key known to said first peer to peer communications device;
transmit the generated expression during a discovery time interval on a first communications channel used for peer device discovery;
receive, from a second peer to peer communications device which received the generated expression, a request for a signed communication;
sign a communication using said private key; and send the signed communication to said second peer to peer communications device; and memory coupled to said at least one processor.

16. The first peer to peer communications device of claim 15, wherein said at least one processor is configured to perform a one-way hash operation using said first public key and said additional input as inputs to the one-way hash operation, said additional input being a time varying input, an output of said hash operation being said generated expression, as part of being configured to generate an expression.

17. The first peer to peer communications device of claim 15, wherein said first peer to peer communications device is a wireless communications device;
wherein said at least one processor is further configured to obtain said first public key from a certificate including said private key and one of a device or user identifier; and
wherein said at least one processor is further configured to receive said request for a signed communication on a second communications channel which is different from said first communications channel used for peer device discovery.

18. A method of operating a first peer communications device, the method comprising:
receiving an expression in a wireless communications channel, said expression communicating a service request, a merchandise advertisement, a merchandise request or location information;
transmitting a request for a signed communication to a second peer to peer communications device associated with the received expression;
receiving from the second peer to peer communications device the signed communication signed using a private key known to said second peer to peer communications device; and
determining if said second peer to peer communication device owns said expression, said step of determining including:
determining if said expression was generated using a first public key corresponding to a private key; and
verifying that the signed communication was generated by the private key corresponding to said first public key.

19. The method of claim 18, wherein said second peer to peer communications device is a wireless communications device.

20. The method of claim 18,
wherein determining if said expression was generated using a first public key includes:
generating a test value from said first public key and an additional input, said additional input being one of a random number and a time dependent input value; and
comparing the test value to said expression to determine if they match, a match indicating that said expression was generated using said first public key; and
wherein generating said test value includes performing a one-way hash operation using said first public key and said additional input as inputs to the one-way hash operation, an output of said hash operation being said test value.

21. The method of claim 18,
wherein said wireless communications channel over which said expression is received is a discovery communication channel used for peer device discovery; and
wherein transmitting a request for a signed communication to the second peer to peer communications device associated with the expression includes transmitting said request over a different communications channel than said discovery communication channel.

22. The method of claim 20,
wherein a device or user identifier to which the first public key corresponds is a member of a group; and
wherein generating a test value includes using a second public key corresponding to a second member of said group in addition to said first public key to generate said test value.

23. The method of claim 22, wherein generating a test value includes:
performing a one-way hash operation using said first and second public keys and said additional input as inputs to the one-way hash operation, an output of said hash operation being said test value.

24. A first peer to peer communications device comprising:
means for receiving an expression in a wireless communications channel, said expression communicating a service request, a merchandise advertisement, a merchandise request or location information;
means for transmitting a request for a signed communication to a second peer to peer communications device associated with said received expression;
means for receiving from the second peer to peer communications device the signed communication signed using a private key known to said second peer to peer communications device; and
means for determining if said second peer to peer communication device owns said expression, said means for determining including:
means for determining if said expression was generated using a first public key corresponding to a private key; and
means for verifying that the signed communication was generated by the private key corresponding to said first public key.

25. The first peer to peer communications device of claim 24, wherein said second peer to peer communications device is a wireless communications device.

26. The first peer to peer communications device of claim 24, wherein said means for determining if said expression was generated using a first public key include:
means for generating a test value from said first public key and an additional input, said additional input being one of a random number and a time dependent input value, said means for generating said test value includes means for performing a one-way hash operation using said first public key and said additional input as inputs to the one-way hash operation, an output of said hash operation being said test value; and
means for comparing the test value to said expression to determine if they match, a match indicating that said expression was generated using said first public key.

27. The first peer to peer communications device of claim 24,
wherein said wireless communications channel over which said expression is received is a discovery communication channel used for peer device discovery, said expression being received prior to transmitting said request for the signed communication to the second peer to peer communications device; and
wherein said request for the signed communication is transmitted to the second peer to peer communications device over a different communications channel than said discovery communication channel used for peer device discovery.

28. The first peer to peer communications device of claim 26,
   wherein a device or user identifier to which the first public key corresponds is a member of a group; and
   wherein said means for generating a test value includes means for using a second public key corresponding to a second member of said group in addition to said first public key to generate said test value.

29. A computer program product for use in a first peer to peer communications device, the computer program product comprising:
   a non-transitory computer readable medium comprising:
      code for causing at least one computer to receive an expression in a wireless communications channel, said expression communicating a service request, a merchandise advertisement, a merchandise request or location information;
      code for causing said at least one computer to transmit a request for a signed communication to a second peer to peer communications device associated with said received expression;
      code for causing said at least one computer to receive from the second peer to peer communications device the signed communication signed using a private key known to said second peer to peer communications device; and
      code for causing said at least one computer to determine if said second peer to peer communication device owns said expression, said code for causing said at least one computer to determine if the said second peer to peer communications device owns said expression including:
         code for causing said at least one computer to determine if said expression was generated using a first public key corresponding to a private key; and
         code for causing said at least one computer to verify that the signed communication was generated by the private key corresponding to said first public key.

30. A first peer to peer communications device comprising:
   at least one processor configured to:
      receive an expression in a wireless communications channel, said expression communicating a service request, a merchandise advertisement, a merchandise request or location information;
      transmit a request for a signed communication to a second peer to peer communications device associated with said received expression;
      receive from the second peer to peer communications device the signed communication signed using a private key known to said second peer to peer communications device; and
      determine if said second peer to peer communication device owns said expression, wherein being configured to determine if said second peer to peer communication device owns said expression includes being configured to:
         determine if said expression was generated using a first public key corresponding to a private key; and
         verify that the signed communication was generated by the private key corresponding to said first public key; and
   memory coupled to said at least one processor.

31. The first peer to peer communications device of claim 30,
   wherein said at least one processor is configured to:
      generate a test value from said first public key and an additional input, said additional input being one of a random number and a time dependent input value; and
      compare the test value to said expression to determine if they match, a match indicating that said expression was generated using said first public key, as part of being configured to determine if said expression was generated using a first public key.

32. The first peer to peer communications device of claim 30, wherein said wireless communications channel over which said expression is received is a discovery communication channel used for peer device discovery; and
   wherein said at least one processor is configured to transmit said request over a different communications channel than said discovery communication channel, as part of being configured to transmit a request for a signed communication to the second peer to peer communications device associated with the expression.

* * * * *